March 17, 1931.  E. SIBLEY  1,797,207
RUMBLE SEAT TOP
Filed Feb. 12, 1929   2 Sheets-Sheet 1
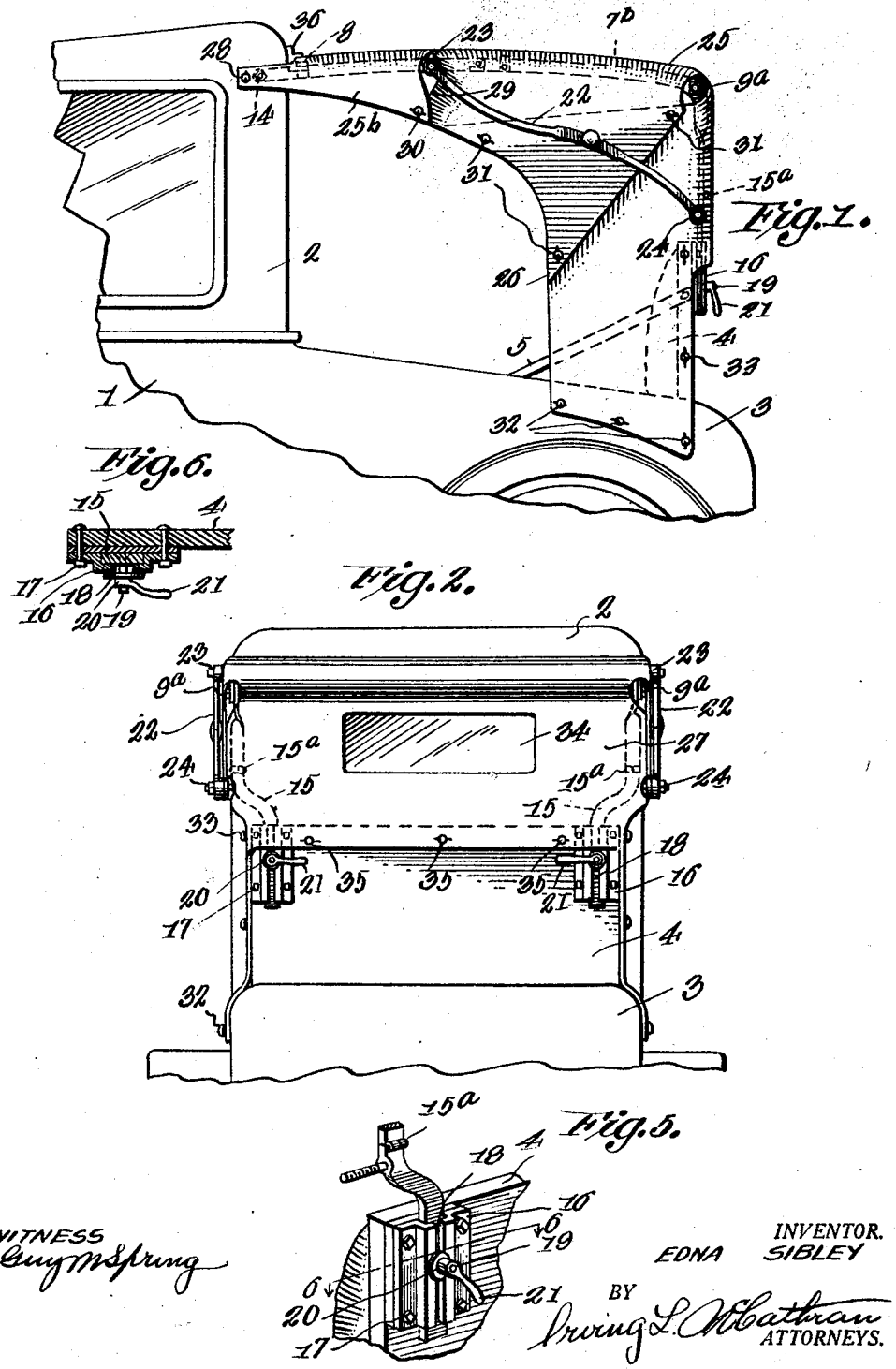
INVENTOR.
EDNA SIBLEY

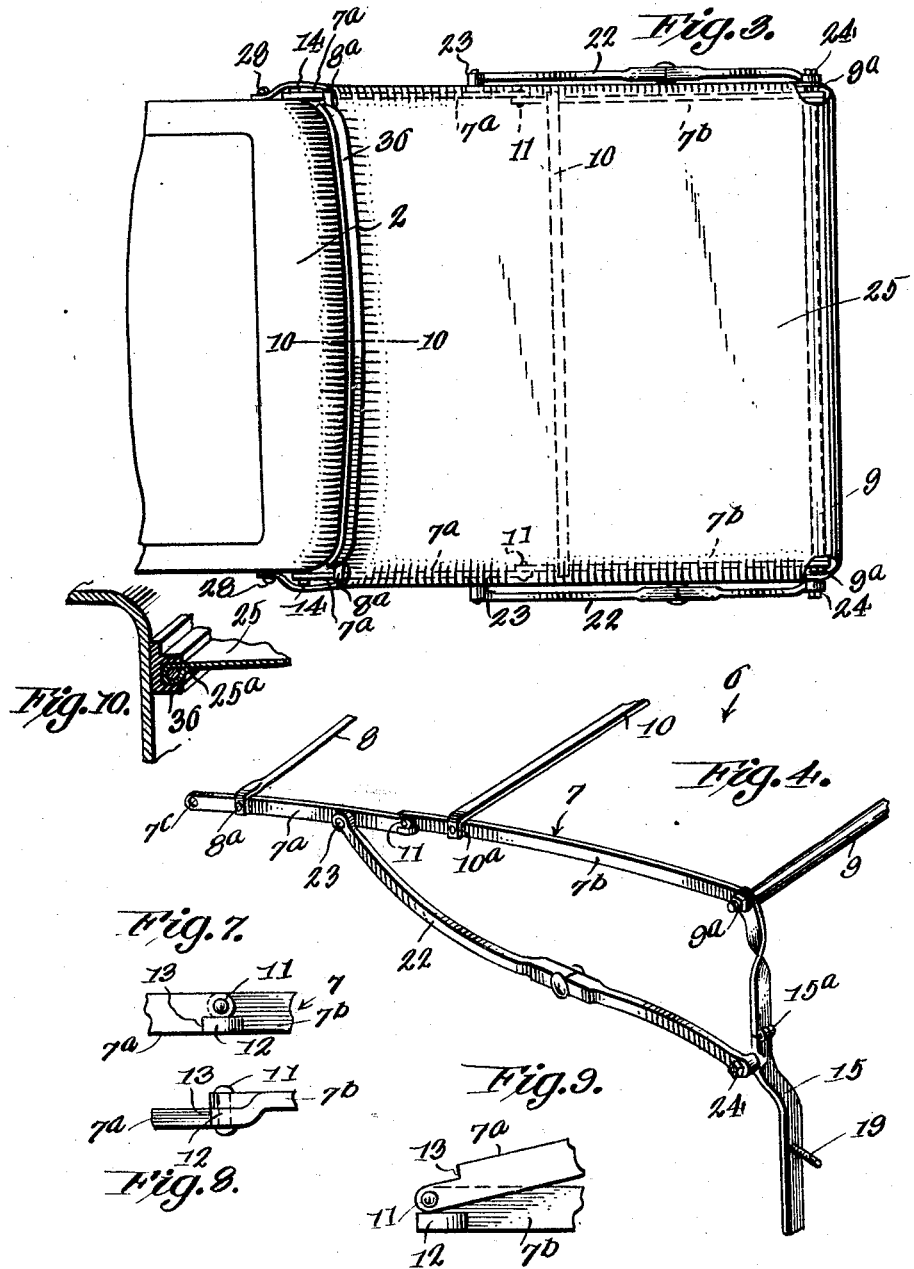

Patented Mar. 17, 1931

1,797,207

UNITED STATES PATENT OFFICE

EDNA SIBLEY, OF KNOX CITY, TEXAS

RUMBLE-SEAT TOP

Application filed February 12, 1929. Serial No. 339,461.

This invention relates to a top for the rumble seats of automobiles, and has for one of its objects to provide a novel and highly efficient device of this character which will be neat and attractive in appearance and capable of being easily and quickly applied to the automobile.

The invention has for a further object to provide a top of the character stated which, when it is not desired to use the rumble seat, may be easily and compactly folded upon the back of the rumble seat when the back is in closed position.

The invention has for a still further object to provide a top of the character stated which shall be capable of being manufactured and sold at a comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a view in side elevation of a fragmentary portion of an automobile equipped with a rumble seat top constructed in accordance with my invention;

Figure 2 is a view in rear elevation of the automobile and rumble seat top;

Figure 3 is a top plan view of the automobile and rumble seat top;

Figure 4 is a perspective view of a fragmentary portion of the frame of the top;

Figure 5 is a perspective view illustrating the manner in which the top is secured to the back of the rumble seat;

Figure 6 is a sectional view taken on the plane indicated by the line 6—6 of Figure 5;

Figures 7, 8 and 9 are views illustrating the hinged connection between the sections of the frame side bars, and Figure 10 is a perspective view illustrating the manner in which a water tight connection is established between the rumble seat top and the top of the automobile.

Referring in detail to the drawings, 1 designates the body, 2 the top and 3 the boot of an automobile of that type equipped with a rumble seat. A seat of this kind comprises a bottom, not shown, which is arranged within the boot 3, and a hinged back 4 which when in raised position extends above the boot and which when in lowered position constitutes a closure for the open upper side of the boot. The back 4 is shown in raised position, and is supported in this position by braces, one of the braces being shown and designated 5.

The top for the rumble seat comprises a frame 6 which consists of side bars or bows 7, a front crossed bar or bow 8, a rear cross bar or bow 9 and an intermediate cross bar or bow 10. The side bars 7 are of sectional formation, and the sections $7^a$ and $7^b$ thereof are connected by pivots 11, so as to permit the front and rear portions of the frame 6 to be folded one upon the other. Lugs 12 carried by the front ends of the side bar sections $7^b$ and received by recesses 13 in the rear ends of the side bar sections $7^a$ serve to prevent the front and rear portions of the frame 6 from having any relative downward movement on the pivots 11. The cross bar 8 is secured as at $8^a$, to the side bars 7 at points spaced rearwardly from the front ends of the side bars. The cross bar 9 has its ends reduced and extended through the rear ends of the side bars 7, and these bars are secured together by nuts $9^a$ mounted upon the reduced ends of the cross bar and contacting with the outer lateral sides of the side bars. The cross bar 10 is secured, as at $10^a$, to the side bars 7 slightly in rear of the pivots 11.

The frame 6 is wider than the rumble seat, and is long enough to extend from the top 2 to a plane situated rearwardly beyond the back 4 of the rumble seat. The cross bar 8 contacts with the rear side of the top 2 and the ends of the side bars 7 contact with lateral sides of the top in a plane situated slightly below the upper side of the top. The ends of the side bars 7 are secured to the top 2 by bolts 14, the side bars 7 being provided with openings $7^c$ for the reception of the bolts. The rear end of the frame 6 is supported from the back 4 of the rumble seat by upright arms or bows 15 which have their upper ends pivotally connected to the reduced ends of the cross bar 9 at points inwardly of the side bars 7. The arms 15 have inwardly offset lower portions which are removably positioned in sockets 16 secured, as at 17, to the rear side of the back 4 of the rumble seat. The sockets 16 are provided in their rear sides with slots 18 for the reception of bolts 19 carried by and extending rearwardly from the arms 17. Nuts 20 provided with handles 21 and mounted on the bolts 19 in contact with sockets 16, serve to firmly secure the arms to the sockets. The arms 15 are of sectional formation. The sections of the arms 15 are pivotally connected, as at 15ª, to permit the upper sections to be swung rearwardly but not forwardly with respect to the lower sections.

Folding braces or bows 22 which are adapted to break upwardly are pivoted at their front ends to the side bars 7 by bolts 23, the pivotal connection between these parts being located forwardly of the pivots 11. The braces 22 have their rear ends pivotally connected to the arms 15 by bolts 24 which extend laterally outward from the arms at points below the hinges 15ª. The bolts 19 and 24 may be permanently fixed to the arms 15 in any well known or appropriate manner.

The top for the rumble seat also comprises a cover 25, side curtains 26 and a rear curtain 27. These parts may be made from any well known material, and are by preference formed integrally. The cover 25 overlies the frame 6, and it extends downwardly along the lateral sides of the frame. The cover 25 has its front end looped above the cross bar 8 and is secured in looped form, as at 25ª. The front ends of the side flaps 25ᵇ of the cover 25, are connected to the lateral sides of the top 2 by turn buttons 28. The side flaps 25ᵇ gradually increase in width in a rearward direction and have concave lower edges. To permit them to be passed over the bolts 23, the side flaps 25ᵇ are split as at 29, and the flap portions at opposite sides of the splits are connected by turn buttons 30. The rear portions of the side flaps 25ᵇ overlap the upper portions of the side curtains 26, and are secured to the side curtains by turn buttons 31. The lower ends of the side curtains 26 are connected to the boot 3 by turn buttons 32, and the rear edges of these curtains are connected to the back 4 of the rumble seat by turn buttons 33. The rear curtain 27 is provided with a window 34, and the lower end thereof is connected to the rear side of the back 4 by turn buttons 35. The turn buttons may be of any well known or appropriate construction, and if desired separable fasteners of any well known or appropriate construction may be used in place of the turn buttons.

A gasket 36 preferably made from rubber and channeled to receive the cross bar 8 and that portion of the cover secured about the bar, contacts with the rear side of the top 2 and establishes a water tight connection between the cover and top. The gasket 36 may be secured to the cross bar 8 in any suitable manner.

To adapt the automobile for the application of the rumble seat top thereto, it is only necessary to secure the bolts 14 and the buttons 28, 32, 33 and 35 to the automobile. As the cover 25 extends from the automobile top to a plane rearwardly beyond the back 4 of the rumble seat, as the rear curtain 27 extends from the rear end of the cover 25 to a point below and rearwardly of the back, and as the side curtains 26 extend from the rear side of the back to a plane situated considerably forward of the back, the top will fully protect the occupant or occupants of the rumble seat. If desired, the side curtains 26 may be detached from the boot 3 and the rear curtain 27 detached from the back 4 and rolled up in order to admit air to the rumble seat, and any suitable means, not shown, may be employed to secure the curtains in raised position. Although the rumble seat top may be readily removed, it is not necessary to remove it in order to prevent the back 4 of the rumble seat to be closed, the pivotal connection of the parts 7, 15 and 22 permitting this top to be easily and compactly folded upon the closed back of the rumble seat. When the rumble seat top is folded, it will occupy a position below the window 34, permitting the driver to clearly observe the traffic in his rear through the window. When the rumble seat top is folded, the upper sections of the arms 15 will be arranged upon the lower sections of the arms, the rear portion of the frame 6 will be arranged upon the folded arm sections, and the front portion of the frame will be arranged upon the rear portion thereof, as should be apparent. To free the rumble seat top so that it may be folded, it is only necessary to disconnect the side bars 7 and the cover flaps 25ª from the top 2. The rumble seat top may be applied to automobiles having rumble seats arranged at differently inclined positions, due to the manner in which it is connected to the main top of the automobile. When applied to an automobile having a rumble seat back occupying a greater inclined position than the one shown, the rumble seat top will support the rumble seat back slightly forward of its normal position without rendering the seat uncomfortable.

While I have described the principle of the invention, together with the structure which I now consider to be the best embodiment thereof, I wish it understood that the structure shown is merely illustrative, and that such changes may be made when desired as are within the scope of the invention as claimed.

What I claim is:

1. In combination, an automobile body having a top and a rumble seat, a frame extending from the top to a point rearwardly beyond the back of the rumble seat, means securing the front end of the frame to the top, sockets secured to the back of the rumble seat and provided with slots, arms connected at their upper ends to the rear end of the frame and having their lower ends positioned in the sockets, bolts carried by the arms and projecting through the slots of the sockets, nuts mounted on the bolts and contacting with the sockets, and a cover for the frame.

2. In combination, an automobile body having a top and a rumble seat, a frame having side bars embracing and secured to the lateral side walls of the top, and a cross bar secured to and carried by the side bars for engaging the rear side wall of the top, arms secured to the back of the rumble seat and to the rear ends of the side bars, a cover for the frame having its front end secured to the cross bar, and a gasket carried by the cross bar having a front flat face and contacting with the rear side wall of the top, the side bars extending forwardly of said cross bar.

In testimony whereof I affix my signature.

EDNA SIBLEY.